United States Patent [19]
Lu et al.

[11] Patent Number: 5,175,030
[45] Date of Patent: Dec. 29, 1992

[54] MICROSTRUCTURE-BEARING COMPOSITE PLASTIC ARTICLES AND METHOD OF MAKING

[75] Inventors: Shih-Lai Lu; Todd R. Williams, both of St. Paul, Minn.

[73] Assignee: Minnesota Mining and Manufacturing Company, St. Paul, Minn.

[21] Appl. No.: 444,361

[22] Filed: Dec. 8, 1989

Related U.S. Application Data

[63] Continuation-in-part of Ser. No. 309,415, Feb. 10, 1989, abandoned.

[51] Int. Cl.⁵ .................... B32B 3/10; F21V 7/04
[52] U.S. Cl. ....................... 428/30; 428/36.9; 428/36.91; 428/172; 428/412; 362/31; 362/32
[58] Field of Search ............ 428/412, 36.9, 36.91, 428/30, 172, 906; 362/31, 32

[56] References Cited

U.S. PATENT DOCUMENTS

| | | | |
|---|---|---|---|
| 3,689,346 | 9/1972 | Rowland | 156/245 |
| 4,374,077 | 2/1983 | Kerfeld | 264/22 |
| 4,414,316 | 11/1983 | Conley | 430/496 |
| 4,420,502 | 12/1983 | Conley | 427/54 |
| 4,477,529 | 10/1984 | Campbell | 428/412 |
| 4,576,850 | 3/1986 | Martens | 428/156 |

OTHER PUBLICATIONS

SPIE Proceedings, vol. 692 p. 235 (1986).

Primary Examiner—Paul J. Thibodeau
Assistant Examiner—D. S. Nakarani
Attorney, Agent, or Firm—Gary L. Griswold; Walter N. Kirn; Steven E. Skolnick

[57] ABSTRACT

A microstructure-bearing composite plastic article can be superior, both in microstructure and in physical properties, when it is a composite of a tough, flexible substrate, at a surface of which is microstructure formed of a cured oligomeric resin having hard segments and soft segments, which cured resin is substantially confined to the microstructure portion of the composite. Such a composite plastic article can be made by depositing an uncured oligomeric resin composition onto a master negative molding surface in an amount barely sufficient to fill the cavities of the master, filling the cavities by moving a bead of the composition between a substrate and the master, and curing the deposited composition by ultraviolet radiation while keeping the temperature during curing to not more than 50° C. above the typical use temperature of the finished composite plastic article.

10 Claims, 1 Drawing Sheet

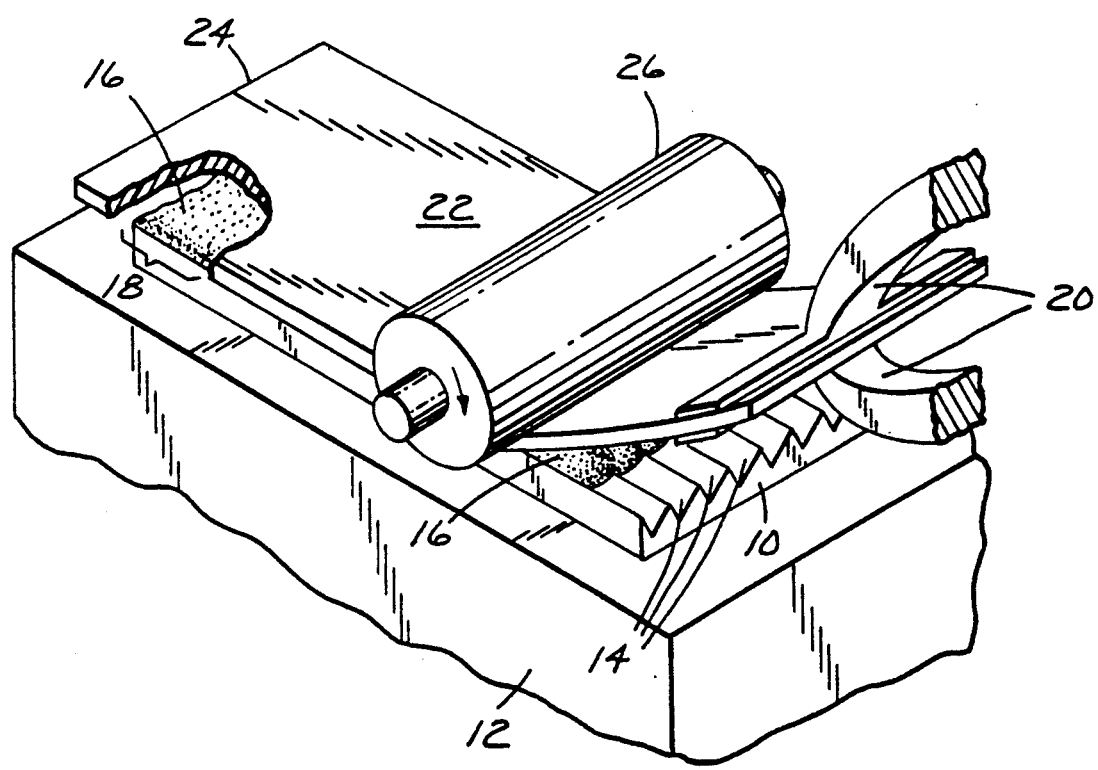

MICROSTRUCTURE-BEARING COMPOSITE PLASTIC ARTICLES AND METHOD OF MAKING

CROSS REFERENCE TO RELATED APPLICATION

This is a continuation-in-part of copending application Ser. No. 309,415 filed Feb. 10, 1989, now abandoned.

BACKGROUND OF THE INVENTION

1. Field of the Invention

The invention concerns plastic articles, the surfaces of which bear microstructure, such as retroreflective cube-corner sheeting, Fresnel lenses, total internal reflecting films, intermeshable articles, information carrying discs, and the like. The invention also concerns an improved method of making such plastic articles.

2. Description of the Related Art

U.S. Pat. No. 3,689,346 (Rowland) teaches a process for the continuous replication of retroreflective cube-corner sheeting by depositing a crosslinkable, lly polymerized resin on a master negative molding surface and employing actinic light or heat to solidify the resin, thus replicating the surface. The resins used typically exhibit relatively high levels of shrinkage upon solidifying or curing, thus giving rise to optical imperfections in the cube-corner microstructure.

The Abstract of U.S. Pat. No. 4,576,850 (Martens) says: "An article comprising crosslinked polymer with hard and soft segments or moieties having a microstructure-bearing surface is prepared by a process comprising filling a mold master, bearing or encoded with microstructure to be replicated, with a fluid, castable, one-part, preferably solvent-free, radiation addition-polymerizable, crosslinkable, organic oligomeric composition (or precursors thereof) having 'hard' segments and 'soft' segments, exposing the resulting cast compositions to radiation, preferably actinic radiation such as ultraviolet radiation, and thereby forming said articles, e.g., a retroreflective cube-corner sheeting, Fresnel lens or video disc." In addition to the hard ("H") and soft ("S") segments, the composition preferably includes one or more "E" precursors "containing a radiation sensitive addition-polymerizable, functional group such as acrylyl, methacrylyl, allyl or vic-epoxy group" (col. 4, ls. 63–66). The composition may also contain diluting monomers which "are addition-polymerizable monomers, viz., ethyenically unsaturated monomers and vic-epoxy reactive diluents. The diluting monomers contribute to the 'H', 'S' or 'E', content of the oligomeric composition" (col. 36, ls. 0–12). The composition may include an addition-polymerization catalyst, preferably a photopolymerization catalyst at about 0.25 to 1.0% of the oligomeric composition.

Almost every example of the Martens patent tests the ability of the oligomeric composition to replicate a diffraction grating master or a video disc master (Example 22), both of which have fine microstructure. The exceptions are Example 20, which reports the replication of cube corners 0.128 mm in depth, and Example 21, which reports the replication of a Fresnel lens, both of which have relatively large microstructures, i.e., several magnitudes greater than that of the diffraction grating. Because a curable resin composition shrinks when cured, it can be more difficult to replicate with precision relatively large microstructures like those of Martens, Examples 20 and 21, as compared to the fine microstructures of the masters used in other examples.

In Example 20 of Martens, a platen press at 70° C. forced the curable mixture into the cube corner depressions, and the thickness of the cured oligomeric resin was 0.25 mm, twice the 0.128 mm depth of the composition was applied at the thickness substantially in excess of the depth of the Fresnel lens elements in order to result in a self-supporting Fresnel lens after the polyester sheet was stripped off.

U.S. Pat. No. 4,374,077 (Kerfeld) specifically concerns information carrying discs such as laser readable video discs which, as noted above, have a fine microstructure. Kerfeld teaches that these discs "can be deposited between a stamper and a substrate to which the polymerized mass is to adhere. The photopolymerizable mass is deposited by moving a bead or wave of the photopolymerizable liquid between a flexible substrate or flexible stamper and the corresponding optical disc stamper or substrate so as to fill the pattern in the stamper and then irradiating the photopolymerizable mass, through either the stamper or the substrate. The advancement of the bead of liquid by the substrate being rolled out over the master has been found to remove substantially all of the air in the mold. The leading edge of the bead tends to pick up and carry the air without re-depositing it in progressive features of the master because the air bubbles rupture, releasing the gas. As long as the substrate or master is able to bend sufficiently to enable the formation of a bead and propagation of that bead as the bend-point is moved forward, the substrate or master is sufficiently flexible" (col. 2. lines 3–68). Substrates used in the Kerfeld examples are flexible films of polyester, poly(vinyl chloride), and poly(methyl methacrylate).

U.S. Pat. No. 4,414,316 (Conley) concerns plastic articles, the surfaces of which replicate relatively large microstructures such as Fresnel lenses. In Examples 1 and 3, a polyester film is coated with a UV-curable resin that is pressed against a lenticular pattern and cured by directing ultraviolet radiation through the polyester film while the resin is in contact with the molding surface. FIG. 2 shows that in the resulting products, the thickness of the layer 12 of cured oligomeric resin is large compared to the depth of the lenticular formations 13. The UV-curable resin preferably is an acrylate urethane polyester oligomer. See also U.S. Pat. No. 4,420,502 (Conley).

SUMMARY OF THE INVENTION

The present invention concerns a composite plastic article having at least one microstructured surface containing a plurality of utilitarian discontinuities ranging in depth from at least 0.025 mm to as great as about 0.5 mm. The composite plastic article of the invention is believed to be superior in flexibility and toughness to any replicated thermoplastic article now on the market that has relatively large microstructure (i.e., at least 0.025 mm). The composite plastic article is believed to be superior in replication fidelity to radiation-cured articles described in the above-cited prior art.

As used herein, the term utilitarian means that the discontinuities provide a positive contribution to the functioning of the article. Optically utilitarian discontinuities provide a positive contribution to the function of an optical device. Representative examples of devices having optically utilitarian discontinuities include, but are not limited to, cube-corner reflective sheeting, refractive or diffractive Fresnel lenses, and films bearing a series of parallel linear prisms with planar facets.

The composite plastic article of the invention is characterized by a tough, flexible substrate, one face of which bears microstructure of a depth of at least 0.025 mm, the microstructure comprising a flexible cured oligomeric resin having hard segments and soft segments, which cured oligomeric resin is substantially confined to the microstructure portion of the composite. By "tough, flexible" is meant that the substrate has a tensile strength of at least approximately 1500 MPa and can be bent to a radius of 3 cm or less without breaking. The cured oligomeric resin (sometimes also referred to herein as the polymerized resin) typically has a thermal expansion coefficient (TEC) that is from 1.33 to 6 times greater than the TEC of the flexible substrate (sometimes also referred to herein as the preformed substrate).

Useful oligomeric resin compositions which cure to a flexible state include, but are not limited to, acrylate, epoxy or urethane based materials, but preferably they are acrylate based materials. As used herein "acrylate" encompasses methacrylate. By a "flexible state" is meant that a film of the cured oligomeric resin 0.25 mm in thickness can be bent to a radius of 3 cm or less without breaking.

The invention also concerns a method for making the novel microstructure-bearing composite plastic article. That method includes the following steps:
  (a) preparing a one-part, solvent-free, radiation-polymerizable, crosslinkable, organic oligomeric resin composition having hard segments and soft segments,
  (b) depositing the oligomeric resin composition onto a master negative microstructure molding surface in an amount barely sufficient to fill the cavities of the master,
  (c) filling the cavities by moving a bead of the composition between a preformed substrate and the master, at least one of which is flexible, as taught in the Kerfeld patent, and
  (d) irradiating the deposited composition to provide a composite of said substrate and polymerized oligomeric resin, and when the thermal expansion coefficient (TEC) of the substrate and the polymerized resin are not approximately equal, limiting the temperature during curing to not more than 30° C. above the typical use temperature of the finished composite plastic article.

As used herein, the typical use temperature of the finished composite plastic article means the steady state operating temperature attained during normal use of the finished composite.

As taught in the Martens patent, the oligomeric resin composition of step (a) can be a one-part, solvent-free, radiation addition-polymerizable, crosslinkable, organic oligomeric composition having hard segments and soft segments plus a photoinitiator at from about 0.1 to 0.5% by weight of the resin composition. The hard segments preferably are polyurethane and the soft segments preferably are polyester.

The viscosity of the reactive oligomeric resin composition as deposited in step (b) should be within the range of about 1,000 to 5,000 cps. Above that range, air bubbles might be entrapped, and the resin might not completely fill the cavities of the master. If an attempt were made to obtain a viscosity below that range, the overall equivalent weight (weight per number of reactive groups) of the oligomeric resin typically would be so low that the resin would experience shrinkage upon curing to such an extent that the cured oligomeric resin would not faithfully replicate the master molding surface. Preferably, the viscosity of the resin is from 2,000 to 3,000 cps. Within that preferred range, the oligomeric resin composition should completely fill the cavities without any need to apply more than hand pressure. However, when the cavities are unusually deep and/or narrow, it may be desirable to reduce the viscosity below about 2,000 cps, because some shrinkage is to be preferred over any failure to fill the cavities completely.

In order to achieve the desired viscosity, it usually is necessary to include a reactive monomer in the oligomeric resin composition. When the oligomeric resin composition is acrylate-based, the reactive monomer may be an ethylenically unsaturated monomer such as an alkyl acrylate or other examples revealed in the Martens patent. The relative amounts of oligomer and monomer should be controlled so that the overall equivalent weight of the composition is not so low that there is unacceptably high shrinkage upon curing.

In step (b), sufficient pressure should be applied to squeeze out excess resin so that the resin thickness above the cavities is less than about 20% of the depth of the cavities, preferably no greater than about 10%. By maintaining a minimum resin thickness, the heat rise during curing can be kept to a minimum. When the amount of the oligomeric resin composition remaining after step (b) has been substantially more than sufficient to fill the cavities (e.g., covers the cavities by more than 20% of their depth), the resulting composite plastic articles have not faithfully replicated the master molding surface. Furthermore, larger amounts of the oligomeric resin composition would be uneconomical since the oligomeric resin typically is much more expensive than the substrate material.

Polycarbonate film is a preferred substrate for use in step (c), being economical, optically clear, and having good tensile strength. When its thickness is from about 0.1 to 1.2 mm, it has sufficient strength and flexibility to permit it to move a bead of the oligomeric composition across a rigid master negative molding surface.

In addition to polycarbonate, useful substrates for the microstructure-bearing composite plastic articles of the invention include cellulose acetate butyrate, cellulose acetate propionate, poly(ether sulfone), poly(methyl methacrylate), polyurethane, polyester, poly(vinylchloride), glass, metal, and paper. The surface of any such substrates may first be treated to promote adhesion to the oligomeric resin.

During step (d), heat from the curing source and heat of reaction can cause the temperature of the oligomeric resin composition, substrate and master to rise prior to completion of the cure. When the cured oligomeric resin and substrate of the composite plastic article are removed from the master and allowed to cool to ambient temperature, they shrink to an extent dependent on their respective TECs. When there is a temperature rise during step (d) and the TECs of the substrate and cured oligomeric resin are equal, symmetrical shrinkage should occur, thus preserving replication fidelity. When the TECs of the cured oligomeric resin and substrate are dissimilar, asymmetric shrinkage of the composite occurs upon cooling. Asymmetric shrinkage can produce distortion of the microstructured pattern and poor reproduction fidelity. While some distortion and poor reproduction fidelity can be tolerated in mechanical applications, they are less tolerable when the composite plastic article has optically utilitarian discontinuities.

Unfortunately, it is currently impractical to obtain a perfect TEC match when making an optically useful composite of the invention. Substrates known to be optically useful are glassy, thermoplastic polymers having a $T_g$ above room temperature and a TEC of about $0.1-1 \times 10^{-4}$ mm/mm/°C. (reported) or about $0.3-1.5 \times 10^{-4}$ mm/mm/°C. (experimentally determined). Radiation-polymerizable oligomeric resins which cure to a flexible state and are known to be useful in producing optical composites of the invention have (when polymerized) at least one $T_g$ below room temperature and a TEC (experimentally determined) of about $2-3 \times 10^{-4}$ mm/mm/°C. TEC was experimentally determined according to ASTM D 696 modified to utilize 3 mm wide by 9-13 mm long sample strips of material having a thickness of 0.05 to 0.5 mm. A Perkin-Elmer TMA Thermomechanical Analyzer was used to make the TEC measurements. It was operated in the extension mode over a temperature range of 20° to 80° C. in a programmable air bath. The differences in reported and experimentally determined TEC values are well known to those skilled in the art and can be correlated with variations in degree of orientation of the sample, crystallinity in the sample and deviations from the machine or cross-machine directions which occur when the sample is cut from a film. The difference in TEC between the substrate and polymerized resin would cause distortion of the microstructure and deterioration of the optical performance of the composite unless care were taken to minimize the temperature rise of the process. The temperature in step (d) is not more than 30°, preferably not more than 10° C., above the normal use temperature of a finished optically useful composite article of the invention. In most applications this corresponds to a maximum temperature during curing of 50° C.

When the oligomeric resin composition is polymerized by radiation, the temperature can be controlled in any of a number of ways, e.g., by passing the radiation through a heat filter, by cooling the air adjacent the curing resin, by cooling the mold with a suitable heat exchange medium, by cooling the oligomeric resin composition before application to the mold, by controlling the intensity of radiation, and when employing actinic radiation, by restricting the amount of photoinitiator.

When employing actinic radiation, the amount of the photoinitiator preferably is no more than 0.5% by weight of the resin composition. On the other hand, when the amount of the photoinitiator is less than 0.1% by weight of the resin composition, the polymerization might proceed at an uneconomically slow rate. When the actinic radiation is ultraviolet, preferred photoinitiators include derivatives of acetophenone, such as the commercially available compounds 1-hydroxycyclohexyl acetophenone ("Irgacure" 184, a solid available from Ciba-Geigy), and 2-hydroxy-2-methyl propiophenone ("Darocur" 1173, a liquid available from EM Industries).

The intensity of radiation should be selected such that it completely cures the oligomeric resin composition at an economically rapid rate of production. When the depth of the microstructure is close to 0.025 mm, it usually is possible to complete the curing within about one second while keeping the temperature of the oligomeric resin composition below 50° C. Greater depths of the microstructure require longer times of exposure in order to keep the temperature desirably low, e.g., about 10 seconds for a depth of about 0.5 mm.

When controlling the temperature of the process by cooling the oligomeric resin composition, its viscosity rises and can become too high for easy delivery to the master. When the temperature of the master molding surface is lowered, such as by placing the master in contact with a cooled heat exchange fluid, the adhesion of the polymerized resin usually increases and may become too high to allow clean removal from the master, especially when the mold is metal. Better release is obtained from a thermoplastic master that has a surface energy below 33 dynes/cm.

A preferred master for use in the above-outlined method of the invention is a sheet of thermoplastic resin that is stable to the curing conditions and has been embossed by a metallic master tool such as nickel-plated copper or brass. Such a thermoplastic master is relatively inexpensive and yet can be used to form a few thousand composite plastic articles of the invention before becoming unduly worn.

When the thermoplastic master is made from a radiation-transparent thermoplastic material, the reactive oligomeric resin can be cured by being irradiated through the master. By using a radiation-transparent master, substrates for the composite plastic articles of the present invention can be opaque, e.g., have a reflective metallic or other coating or decorative imprinting or be impregnated with a pigment or dye. The substrates can have any thickness. A thermoplastic master can have sufficient body and flexibility to permit it to move a bead of the oligomeric composition across the substrate, which accordingly can be rigid.

When the master is made from a radiation-transparent thermoplastic resin such as a polyolefin, it is possible to prepare composite plastic articles bearing microstructures on both surfaces of the substrate.

By being made of thermoplastic resin, the master can have a low-energy surface that affords good release from a cured oligomeric resin. Good release is assured when there is a significant difference in surface energy between the surfaces of the master and the cured oligomeric resin, the latter typically being about 40-41 dynes/cm. Because the surface energy of each of polypropylene and polyethylene is about 30-31 dynes/cm, these afford easy separation of the cured oligomeric resin. However, when polypropylene is corona treated, its surface energy increases to about 44 dynes/cm, thus making it less suitable for use in a molding master but a good candidate for the substrate of a novel microstructure-bearing composite plastic article. Poly(vinylchloride) and cellulose acetate butyrate, both of which are about 39-42 dynes/cm in surface energy also provide good bonding with the cured microstructure but could not be used as the master molding surface without a release agent. Polyolefins are more transparent to and stable towards ultraviolet radiation than are poly(vinylchloride) and cellulose acetate butyrate.

A particularly preferred material for use in a master is a laminate of polyethylene and polypropylene which has been embossed with the polyethylene layer in contact with the metallic master tool at a temperature above the softening point of the polyethylene and below that of the polypropylene. The polypropylene layer of the laminate affords the strength and flexibility needed to permit it to move a bead of the oligomeric composition across a rigid master negative molding surface, and the polyethylene layer provides the low $T_g$ and melt temperature to facilitate replication of the original master tool.

The composite plastic article of the invention can bear a linear prism microstructure to be a total internal reflecting film (TIRF). A preferred TIRF has a polycarbonate substrate about 0.1 to 0.25 mm in thickness and a microstructure from 0.05 to 0.2 mm in depth. Such a TIRF can be rolled up to form a light pipe 2 to 3 cm in diameter without crazing or breaking. In comparison, prior art TIRF made of polycarbonate film, one surface of which has a linear prism microstructure, cannot be rolled to less than about 7.5 cm in diameter without crazing or breaking. Preferred microstructure for light pipes has been described in SPIE Proceedings, Vol. 692, p. 235 (1986).

Plastic articles of the invention include cube-corner retroreflectors, Fresnel lenses, and other lenticular microstructures.

T-TEST VALUE

The optical quality of a TIRF can be evaluated with apparatus including a laser (Spectra-Physics Inc. Model 117A) with a spatial filter, beam expander, and collimator. Two diaphragms or irises are placed 18 and 38 cm from the laser, and an annular sample holder with an opening 6.35 cm in diameter is placed 84 cm from the laser. Directly behind the sample holder is an integrating sphere (with a 1-cm diameter aperture) and a "Labsphere" ML-400 radiometer. Using the diaphragms or irises, the laser is focused through the aperture to obtain a clean circle of light of about 3 mm diameter on a black surface mounted on the sample holder. A source intensity measurement of 100% is taken with no sample in place. The TIRF to be tested is then mounted on the sample holder with its flat surface facing the laser and its grooves extending vertically. Unless otherwise reported, T-Test Values are measured at ambient temperature. Readings are then made at from 12 to 15 different points on the TIRF within a 5-cm diameter area while making sure that none of the light strikes the frame of the sample holder. The readings are averaged and multiplied by 100 to give percent transmission which is the T-Test Value of the TIRF sample. A T-Test Value of 5% or less indicates that the TIRF is substantially totally internally reflecting.

INTERFEROMETRY FRINGE CURVATURE TEST (CURVE VALUE)

An individual groove face of a TIRF can be studied by reflectance interferometry in a microscope, with a monochromatic light source. By proper adjustment of the interferometer, the field of view shows a number of evenly spaced alternating dark and bright bands (fringes) aligned nominally perpendicular to the groove direction. The repeating distance between dark bands corresponds to one half of the wavelength of the light source. If the groove face is perfectly flat, the fringes will be straight lines. If the groove face is not flat, e.g., due to distortion of the replication layer, the fringes will be curved. From a photograph of the interferogram, the amount of curvature can be measured and compared to the inter-fringe spacing. The curvature can then be expressed as a number of wavelengths of deviation from straight (i.e., "Curve Value"). The Curve Value corresponds directly with the number of wavelengths of deviation from flatness of the groove face.

THE DRAWING

The invention may be more easily understood in reference to the drawing, the single figure of which is a schematic isometric illustration of a method of producing microstructure-bearing composite plastic articles of the invention In the drawing, a TIRF master 10, with its grooves 14 facing upwardly, is laid on a flat table 12. A bead of UV-curable resin 16 is deposited across one edge 18 of the grooves 14 in an amount barely sufficient to fill the grooves completely. A clamp 20 is fastened along one edge of a flexible, transparent, plastic film 22, and the opposite edge 24 of the plastic film is laid onto the bead of resin to extend slightly beyond said one edge 18 of the grooves. A hard rubber roller 26 is brought into contact with said opposite edge 24 of the plastic film 22 and rolled across the plastic film, thus advancing the bead of resin 16 to fill the grooves 14. Then after the UV-curable resin has been cured by being exposed to ultraviolet radiation through the plastic film 22, the clamp 20 is lifted to peel the resulting microstructure-bearing composite plastic article from the master 10, thus enabling the master to be reused.

DETAILED DESCRIPTION

In the examples, all parts are given by weight.

EXAMPLE 1

A liquid UV-curable oligomeric resin composition having a viscosity of 1600 cps was prepared by blending together:

| Reactants | Parts |
|---|---|
| Acrylate-capped polycaprolactone urethane oligomer | 54.3 |
| N-vinyl pyrrolidone | 16.3 |
| [(2-ethoxy)-2-ethoxy]ethyl acrylate | 11.3 |
| 1,6-hexanediol diacrylate | 5.7 |
| N-(isobutoxy methyl)acrylamide | 11.1 |
| Tertiary amine mixture ("Tinuvin" 292) | 1.0 |
| 1-hydroxycyclohexyl acetophenone | 0.25 |

The acrylate-capped polycaprolactone urethane oligomer had been prepared as described in Examples 1-6 of the Martens patent except that 0.75 mole of polycaprolactone triol ("Niax" PCP-310) was employed in addition to the 1.5 moles of the diol, and 2-hydroxyethyl acrylate was employed instead of the methacrylate.

Used as a master negative molding surface was a laminate of polyethylene (0.375 mm) and polypropylene (1.0 mm), the polyethylene surface of which had been embossed by a nickel-plated copper master tool to have a total internal reflecting pattern of linear prisms 0.175 mm deep an 35 mm peak-to-peak.

As illustrated in the drawing, liquid UV-curable oligomeric resin composition was poured along one edge of the molding surface and overlaid with a polycarbonate film 0.25 mm in thickness. Then using a rubber roller, excess oligomeric resin composition was squeezed out, leaving about 0.025 mm overlying the peaks of the prisms. This was irradiated through the polycarbonate substrate using 3 passes under a medium-pressure mercury lamp of 350-380 mm, 200 watts per linear inch (82 watts per linear cm) of arc (UVEXS model LCU 750 UV processor) 4 cm from the surface of the deposited oligomeric resin composition, thus providing a total exposure of about 5 seconds which corresponds to a dosage range of from about 200 to 400 mJ/cm².

The resulting microstructure-bearing composite TIRF was peeled from the master molding surface and had a T-Test Value of 3.5%. It was used to make a light pipe by rolling two pieces and inserting them in abutting relation into a rectangular enclosure 4.4 cm on each side and approximately 63 cm in length. Three sides of the enclosure were pigmented poly(methyl methacrylate) resin, and the fourth side was a polycarbonate diffusing film. At one end of the enclosure was a mirror and at the other end was a small collimated light source. Approximately 9.5 cm of the diffusing film extending from the end of the enclosure supporting the light source were covered with k tape to allow light intensity measurements to be taken along the remainder of the diffusing film. Light meter readings, which are reported in Table A, were taken at 2.5 cm intervals along the length of the diffusing film beginning at a distance of 35.1 cm from the light source. Test Point 11 was 60.5 cm from the light source or 2.5 cm from the mirror. The high values at Test Point 9 and 10 are attributed to the two pieces being abutted against each other between Test Points 9 and 10. Table A summarizes initial test data as well as data obtained approximately 30 days after the TIRF was prepared.

TABLE A

| Test Point | Light-meter Readings | |
|---|---|---|
| | Initial | 30 Day |
| 1 | 216 | 217 |
| 2 | 206 | 204 |
| 3 | 204 | 197 |
| 4 | 196 | 196 |
| 5 | 193 | 198 |
| 6 | 194 | 199 |
| 7 | 200 | 205 |
| 8 | 210 | 215 |
| 9 | 245 | 258 |
| 10 | 243 | 250 |
| 11 | 191 | 198 |

For purposes of comparison, a microstructure-bearing plastic article was made to be identical to that of Example 1 except that the peaks of the master molding surface were allowed to be covered by 0.075 mm of the oligomeric resin composition. Its T-Test Value was 6.8%, thus showing the importance of restricting the deposited oligomeric resin composition to an amount barely sufficient to fill the cavities of the master molding surface.

EXAMPLE 2

A liquid UV curable oligomer resin composition having a viscosity of 1720 cps was prepared by blending together:

| Reactants | Parts |
|---|---|
| Oligomer of Example 1 | 70.8 |
| Isooctyl acrylate | 22.9 |
| 1,6-hexanediol diacrylate | 6.0 |
| 1-hydroxycyclohexyl acetophenone | 0.25 |

This oligomeric resin composition was used as in Example 1 to make a composite TIRF plastic article except that the polyolefin master had a pattern of linear prisms 0.088 mm deep and 0.175 m peak-to-peak, and the thickness of the polycarbonate substrate film was 0.125 mm. The resultant composite TIRF showed a T-Test Value of 3.7%.

EXAMPLE 3

The same UV-curable oligomeric resin composition and polyolefin master of Example 2 were employed to form a composite TIRF plastic article except that the transparent substrate film was 0.25-mm polyethersulfone. The resultant composite TIRF showed no sign of distortion after being heated at 177° C. for one hour. For comparison, the composite TIRF of Example 2 distorted when heated in the same way.

EXAMPLE 4

The UV-curable oligomeric resin composition and polyolefin master of Example 2 were employed to form a composite TIRF plastic article except that the substrate was kraft paper (0.2 mm thick), one face of which had an aluminum vapor-deposited coating which was laid against the UV-curable resin. The resin was then cured by being irradiated through the polyolefin master. The resultant composite TIRF had good integrity and was easily removed from the master.

This example shows how an opaque substrate can be positioned immediately behind transparent microstructure by a simple, economical procedure.

EXAMPLE 5

The polyethylene face of a sheet of polyethylene/-polypropylene (0.375 mm/1.0 mm) was heat embossed from a nickel-plated copper master tool to provide a negative molding surface having a Fresnel pattern depth ranging from 0.025 mm to 0.125 mm. Using the UV-curable oligomeric resin composition of Example 2 plastic Fresnel lens was produced by the procedure of Example 1.

EXAMPLE 6

The UV-curable oligomeric resin composition and polyolefin master of Example 2 were used as in Example 2 to produce a composite TIRF plastic article, the flat side of which was then used as a substrate for forming a second TIRF surface using the same resin and the same master, followed by ultraviolet irradiation through the master. The resulting composite plastic article had identical microstructure at both faces of the polycarbonate film (0.25 mm), with the linear grooves at one surface extending orthogonally to those at the other surface.

EXAMPLE 7

A liquid UV-curable oligomeric resin composition having a viscosity of 2400 cps was prepared by blending together:

| Reactants | Parts |
|---|---|
| Acrylate-capped urethane oligomer containing 20% propoxylated neopentyl glycol diacrylate ("Photomer" 6827, from Henkel Corp.) | 78.1 |
| Isooctyl acrylate | 21.6 |
| 1-hydroxycyclohexyl acetophenone | 0.25 |

Using the master and procedure of Example 1, a composite TIRF plastic article was produced having a T-Test Value of 2.7%.

EXAMPLES 8-13

A liquid UV-curable oligomeric resin composition was prepared by blending the following materials together:

| Reactants | Parts |
| --- | --- |
| Polyether urethane acrylate oligomer ("Ebecryl" 4826, available from Radcure Specialties, Inc.) | 75 |
| Neopentylglycol propoxylate diacrylate ("Photomer" 4127) | 25 |
| 2-Hydroxy-2-methyl propiophenone | 0.5 |

This oligomeric resin composition was used as in Example 1 to make composite TIRF plastic articles except using a metal master mold having the same dimensions as the master mold of Example 1, the substrate was a 0.0175-mm biaxially oriented poly(ethylene terephthalate) film, and the oligomeric composition was cured by irradiating through the substrate rather than the master mold. Curing was effected by a UV irradiation dosage of 400 mJ/cm: and the excess resin (as a percentage of the pattern depth) was as indicated in Table B. The effect of temperature during curing was monitored by placing the uncured TIRF sandwiches on 0.64 cm thick aluminum plates and equilibrating the assemblies at the temperatures indicated in Table B prior to curing. The temperature of the assembly was also monitored as it exited the UV processing unit. The resulting microstructure-bearing composite TIRF plastic article with its substrate intact was peeled away from the master molding surface, and the replication fidelity was determined by the T-Test Value and the Interferometry Fringe Curvature Test, the results of which are called "Curve Value" in the following tables.

TABLE B

| Example | Excess Resin Thickness | Initial Temp. (°C.) | Exit Temp. (°C.) | Initial T-Test Value (%) | Initial Curve Value |
| --- | --- | --- | --- | --- | --- |
| 8 | 28% | 0 | 13 | 2.24 | 0.28 |
| 9 | 14-28% | 0 | 14 | 2.58 | 0.13 |
| 10 | 21% | 35 | 38 | 3.07 | 0.86 |
| 11 | 14% | 35 | 44 | 2.55 | 1.35 |
| 12 | 21% | 70 | 67 | 5.48 | 1.52 |
| 13 | 14% | 70 | 70 | 5.33 | 1.82 |

The composites of Examples 8-13 were then aged at 70° C., and the T-Test and interferometry test for "Curve Value" repeated after 240 and 480 hours aging. Results of these tests are reported in Table C.

TABLE C

| Example | 240 hr T-Test Value (%) | 240 hr Curve Value | 480 hr T-Test Value (%) | 480 hr Curve Value |
| --- | --- | --- | --- | --- |
| 8 | 1.71 | 0.15 | 2.10 | 0.12 |
| 9 | 2.13 | 0.10 | 2.43 | 0.08 |
| 10 | 2.99 | 0.86 | 3.59 | 0.83 |
| 11 | 2.52 | 1.04 | 3.41 | 1.05 |
| 12 | 4.88 | 1.52 | 6.31 | 1.75 |
| 13 | 4.85 | 1.50 | 6.36 | 1.83 |

The data in Tables B and C demonstrate that TIRF articles cured at higher temperatures show higher TTest Values and higher Curve Values, indicative of inferior reproduction fidelity.

EXAMPLES 14-19

A liquid UV-curable oligomeric resin composition was prepared by blending the following materials together:

| Reactants | Parts |
| --- | --- |
| Polyether urethane acrylate oligomer ("Ebecryl" 4826) | 35 |
| Polyester urethane acrylate oligomer ("Photomer" 6019) | 50 |
| Neopentylglycol propoxylate diacrylate ("Photomer" 4127) | 15 |
| 2-Hydroxy-2-methyl propiophenone | 0.5 |

The procedure of Examples 8-13 was followed to produce microstructure-bearing composite TIRF plastic articles which were subjected to fidelity testing as reported in Table D.

TABLE D

| Example | Excess Resin Thickness | Initial Temp. (°C.) | Exit Temp. (°C.) | Initial T-Test Value (%) | Initial Curve Value |
| --- | --- | --- | --- | --- | --- |
| 14 | 70% | 1 | 16 | 2.03 | 0.08 |
| 15 | 126% | 0 | 13 | 1.83 | 0.83 |
| 16 | 98% | 35 | 45 | 3.01 | 1.10 |
| 17 | 126% | 36 | 45 | 2.68 | 1.14 |
| 18 | 56% | 70 | 72 | 5.16 | 1.94 |
| 19 | 84% | 69 | 70 | 4.75 | 2.39 |

The composites of Examples 14-19 were then aged at 70° C., and T-Test Value and interferometry measurements repeated after 240 and 480 hours aging. Results of these tests are reported in Table E.

TABLE E

| Example | 240 hr T-Test Value (%) | 240 hr Curve Value | 480 hr T-Test Value (%) | 480 hr Curve Value |
| --- | --- | --- | --- | --- |
| 14 | 3.02 | 0.96 | 4.14 | 1.03 |
| 15 | 2.77 | 1.01 | 3.74 | 0.9 |
| 16 | 3.91 | 2.35 | 5.05 | 1.76 |
| 17 | 3.77 | 1.99 | 5.18 | 1.55 |
| 18 | 5.99 | 2.59 | 7.05 | 2.22 |
| 19 | 5.47 | 2.66 | 7.10 | 3.27 |

Comparison of the data in Tables D and E with the data in Tables B and C reveals that over a range of from about 14% to about 130% excess resin, curing the oligomeric resin composition at higher temperatures resulted in inferior replication fidelity. It should also be noted that T-Test Values and Curve Values for the samples of Examples 14-19, which were prepared with substantially more than 20% excess resin, were higher than the values for the samples of Examples 8-13 which were prepared with significantly less excess resin.

EXAMPLE 20

The TIRF samples of Examples 8, 10 and 12 after hours aging were separately mounted in the T-Test apparatus, and the T-Test Value of each was measured as the film was alternately heated to about 90° C. and allowed to cool. At each change in temperature the T-Test Value was recorded after it had stabilized. A commercially available acrylic TIRF article (Scotch@ Optical Lighting Film, Prod. #2300, available from 3M) was also evaluated under similar conditions. Results are reported in Table F.

TABLE F

| Example | Initial T-Test Value (%) | Hot T-Test Value (%) | Cool T-Test Value (%) | Reheated T-Test Value (%) | Recooled T-Test Value (%) |
| --- | --- | --- | --- | --- | --- |
| 8 | 2.30 | 2.08 | 2.28 | 2.05 | 2.28 |
| 10 | 3.65 | 1.95 | 3.62 | 1.84 | 3.62 |
| 12 | 7.17 | 4.23 | 7.26 | 4.03 | 7.15 |
| Commercial TIRF | 0.98 | 1.26 | 1.00 | 1.30 | 1.00 |

The data in Table F indicate that the TIRF articles of Examples 8, 10 and 12 experience a decrease in the T-Test Value as the films are heated, indicative of stress relief in a film as its temperature approaches the temperature at which its reactive oligomeric resin composition was cured. This behavior stands in contrast to the commercially available TIRF article which shows a higher T-Test Value as it is heated.

EXAMPLE 21

A liquid UV-curable oligomeric resin composition was prepared by blending the indicated materials together:

| Reactants | Parts |
| --- | --- |
| Polyether urethane acrylate oligomer ("Ebecryl" 4826) | 40 |
| Polyester urethane acrylate oligomer ("Photomer" 6008) | 40 |
| Neopentylglycol propoxylate diacrylate ("Photomer" 4127) | 20 |
| 2-Hydroxy-2-methyl propiophenone | 0.5 |

The oligomeric resin composition at 65°-70° C. was deposited on a rotating metal cylindrical mold that had a 0.178 mm deep TIRF pattern arranged with the grooves running circumferentially. As the cylinder rotated, a polycarbonate substrate was pressed against the resin by a hard rubber roller under a pressure sufficient to leave approximately 0.25-mm of excess resin above the TIRF pattern. Rotation of the cylinder carried the uncured composite past a bank of medium pressure ultraviolet lamps, exposing the uncured oligomeric resin composition to a UV dose of 400-600 mJ/cm to produce a continuous TIRF article. The temperature of the cylindrical metal mold was controlled at various temperatures with circulated heat exchange oil to adjust the cure temperature. T-Test Values for TIRF articles cured at the various temperatures are reported in Table G.

TABLE G

| Cure Temperature (°C.) | T-Test Value |
| --- | --- |
| 65 | 3.0 |
| 55 | 2.5 |
| 40 | 2.1 |

This example demonstrates that lower cure temperatures in a continuous process improve replication fidelity in a manner similar to that observed in batch processes.

EXAMPLE 22

The TIRF article of Example 21 that had been cured at 65° C. was formed into tubes of approximately 50 cm length and two different diameters, and the light transport of the tubes determined. The procedure used to determine the light transport involved: p1 (a) determining the light source intensity with the integrating sphere/radiometer apparatus described above in the procedure for T-Test Value (except that the aperture was about 9 cm) without the sample tube in place,
  (b) placing the sample tube in a rigid acrylic tube fitted with a light source at one end of the tube and the integrating sphere/radiometer apparatus at the opposite end of the tube, and
  (c) determining the intensity of the light transmitted through the tube.
Based on the intensity measurements, a transport factor, which is defined as:

$$\text{Transport Factor} = \frac{-\text{tube length in diameters}}{10 \times \log(\text{transport/source})}$$

was calculated for the sample tubes. Sample tubes fabricated from the aforementioned commercially available acrylic based TIRF article (see Example 20) were also evaluated in this test for comparative purposes. The data for the TIRF article of Example 21 as well as the commercially available TIRF article are reported in Table H.

TABLE H

| TIRF | Cylinder Dia. (cm) | Source Intensity | Measured Transport | Transport Factor Diam./Decibel |
| --- | --- | --- | --- | --- |
| Commercial | 7.0 | 1.007 | 0.859 | 10.53 |
| Commercial | 4.8 | 0.933 | 0.677 | 7.66 |
| Ex 21 | 7.0 | 1.005 | 0.820 | 8.23 |
| Ex 21 | 4.8 | 0.949 | 0.739 | 9.82 |

These data indicate that, at a diameter of 7 cm, the conventional acrylic based TIRF article has superior optical properties, but, surprisingly, at a diameter of 4.8 cm, the TIRF article of Example 21 has superior optical properties.

EXAMPLE 23

"Ebecryl" 4826, a liquid polyether urethane acrylate oligomer composition, was used as in Example 1 to make a composite TIRF article except that the master mold was metal and had a 0.089 mm deep TIRF pattern, and a biaxially oriented poly(ethylene terephthalate) film substrate (0.178 mm thick) was used as the substrate. The oligomeric resin composition was cured with electron beam radiation by exposing the uncured composite to 3 megarads of radiation at 300 kv from an electron beam apparatus (Energy Sciences, Inc.). After the resulting composite plastic article was removed from the master mold, its T-Test Value was determined to be 3.9%.

EXAMPLES 24-25

A liquid UV-curable oligomeric resin composition was prepared by blending the following materials together:

| Reactants | Parts |
| --- | --- |
| Acrylate-capped polycaprolactone urethane oligomer of Example 1 | 60 |
| Butyl carbamoyloxyethyl acrylate | 20 |
| N-(isobutoxy methyl) acrylamide | 16.5 |
| 2-Hydroxy-2-methyl propiophenone | 0.5 |

This oligomeric resin composition was used to prepared composite TIRF acticles using the procedure of Example 21 on a polycarbonate substrate (with an experimetnally determined TEC of $1.1 \times 10^{-4}$ mm/mm/°C., Example 24) and on a poly(ethylene terephthalate) (PET) substrate (having an experimentally determined TEC of $0.4 \times 10^{-4}$ mm/mm/°C., Example 25). The temperature of the heat exchange fluid was maintained at 65° C. throughout the preparation of the TIRF articles Optical performance of the resulting TIRF articles was then evaluated as a function of temperature as previously described in Example 20, with the T-Test values for the two articles reported in Table I.

TABLE I

| EXAMPLE | INITIAL T-TEST VALUE (%) | HOT T-TEST VALUE (%) | COOL T-TEST VALUE (%) | REHEATED T-TEST VALUE (%) | RECOOLED T-TEST VALUE (%) |
|---|---|---|---|---|---|
| 24 | 3.22 | 1.25 | 3.47 | 1.35 | 3.55 |
| 25 | 4.45 | 1.75 | 4.55 | 1.60 | 4.55 |

The data in Table I indicates that the TIRF article of Example 24, which had a smaller difference between the TEC of the cured oligomeric resin composition and the polycarbonate substrate, had lower T-Test values at both ambient conditions and at an elevated temperature than the TIRF article of Example 25. This data shows that optical properties of TIRF articles can be improved if the difference between the TEC's of the substrate and the cured oligomeric resin compositions are minimized It should also be noted that the difference between T-Test Values for the two samples was smaller at elevated temperatures than it was at ambient temperatures, further showing that both samples are approaching a similar unstressed configuration, and hence similar optical properties, at elevated temperatures.

What is claimed is:

1. A composite plastic article comprising a tough, flexible substrate, one face of which bears a microstructure of utilitarian discontinuites, which discontinuities have a depth of at least 0.025 mm to about 0.5 mm, said microstructure comprising a layer of a cured oligomeric resin having hard segments and soft segments, wherein the total thickness of the layer of cured resin is not more than 20% greater than the depth of the discontinuities.

2. A composite plastic article as defined in claim 1, wherein the substrate comprises a tough, flexible, transparent, thermoplastic film.

3. A composite plastic article as defined in claim 2, the substrate of which is a flexible polycarbonate film.

4. A composite plastic article as defined in claim 2, wherein said microstructure makes the composite plastic article a total internal reflecting film.

5. A composite plastic article as defined in claim 4, and formed into a light pipe having a diameter of less than 7.5 cm.

6. A composite plastic article as defined in claim 1 wherein said utilitarian discontinuities comprise optically utilitarian discontinuities.

7. A composite plastic article as defined in claim 1 wherein each surface of said flexible substrate bears a microstructure of said utilitarian discontinuites.

8. A composite plastic article according to claim 1 wherein said cured oligomeric resin has an experimentally determined thermal expansion coefficient that is from 1.33 to 6 times greater than the experimentally determined thermal expansion coefficient of said flexible substrate.

9. A composite article according to claim 8 wherein the experimentally determined thermal expansion coefficient or said flexible substrate is in the range of $0.3 \times 10^{-4}$ mm/mm/°C. to $1.5 \times 10^{-4}$ mm/mm/°C. and said cured oligomeric resin has an experimentally determined thermal expansion coefficient in the range of $2 \times 10^{-4}$ mm/mm/°C. to $3 \times 10^{-4}$ mm/mm/°C.

10. A composite article according to claim 9 wherein one of the hard and soft segments of said cured oligomeric resin has a Tg below room temperature and said flexible substrate has a Tg above room temperature.

* * * * *

UNITED STATES PATENT AND TRADEMARK OFFICE
CERTIFICATE OF CORRECTION

PATENT NO. : 5,175,030
DATED : December 29, 1992
INVENTOR(S) : Shih-Lai Lu, Todd R. Williams It is certified that error appears in the above-identified patent and that said Letters Patent is hereby corrected as shown below:

Col. 1, line 23 "lly polymerized" should read --partially polymerized--.

Col. 1, line 53 "(Col. 36, lines 0-12)" should read --(col. 36, lines 10-12)--.

Col. 2, line 6 "depth of the composition" should read --depth of the microstructure. In Example 21, the oligomeric resin composition--.

Col. 8, line 55 "an" 35 mm" should read -- and 0.35 mm --.

Col. 9, line 15 "with k tape" should read --with black tape--.

Col. 10, lines 35-36 "Example 2 plastic" should read --Example 2 and a polycarbonate substrate film (0.25 mm), a composite plastic--.

Col. 11, line 24 "mJ/cm:" should read --mJ/cm$^2$--.

Col. 11, line 67 "TTest" should read --T-Test--.

Col. 13, line 44 "mJ/cm" should read --mJ/cm$^2$--.

UNITED STATES PATENT AND TRADEMARK OFFICE
CERTIFICATE OF CORRECTION

PATENT NO. : 5,175,030

DATED : December 29, 1992

INVENTOR(S) : Shih-Lai Lu, Todd R. Williams

It is certified that error appears in the above-identified patent and that said Letters Patent is hereby corrected as shown below:

Col. 14, line 1, delete "p 1".

Col. 15, lines 3-4 "experimetnally" should read --experimentally--.

Signed and Sealed this

Twenty-first Day of December, 1993

Attest:

BRUCE LEHMAN

Attesting Officer

Commissioner of Patents and Trademarks